No. 762,706. PATENTED JUNE 14, 1904.
J. H. GROOTERS.
PLANTER.
APPLICATION FILED APR. 28, 1903.
NO MODEL. 6 SHEETS—SHEET 1.

Fig. 1.

WITNESSES:
INVENTOR
John H. Grooters
BY
ATTORNEYS.

No. 762,706. PATENTED JUNE 14, 1904.
J. H. GROOTERS.
PLANTER.
APPLICATION FILED APR. 28, 1903.
NO MODEL. 6 SHEETS—SHEET 2.

Fig. 2.

WITNESSES: INVENTOR
John H. Grooters
BY
ATTORNEYS.

No. 762,706. PATENTED JUNE 14, 1904.
J. H. GROOTERS.
PLANTER.
APPLICATION FILED APR. 28, 1903.
NO MODEL.
6 SHEETS—SHEET 4.

WITNESSES:

INVENTOR
John H. Grooters
BY
ATTORNEYS.

No. 762,706. PATENTED JUNE 14, 1904.
J. H. GROOTERS.
PLANTER.
APPLICATION FILED APR. 28, 1903.
NO MODEL. 6 SHEETS—SHEET 5.

WITNESSES:

INVENTOR
John H. Grooters
BY
ATTORNEYS.

No. 762,706.

Patented June 14, 1904.

UNITED STATES PATENT OFFICE.

JOHN H. GROOTERS, OF ALLENDORF, IOWA.

PLANTER.

SPECIFICATION forming part of Letters Patent No. 762,706, dated June 14, 1904.

Application filed April 28, 1903. Serial No. 154,617. (No model.)

*To all whom it may concern:*

Be it known that I, JOHN H. GROOTERS, a citizen of the United States, and a resident of Allendorf, in the county of Osceola and State of Iowa, have invented a new and Improved Planter, of which the following is a full, clear, and exact description.

My invention relates to an improvement in planters of that type which is provided with a guide wire, chain, or cable, one end of the wire, chain, or cable being adapted for attachment to a stake fastened to the ground at one end of a proposed row, the other end of the wire, chain, or cable being adapted for attachment to a drum mounted to rotate at the rear of the machine.

The purpose of the invention is to provide a means for releasing the seed from the seed box or boxes at proper periods, which means are controlled by the guide wire, chain, or cable used in connection with the machine, and further features of the invention relate to the construction of the seed-dropping devices, means for regulating the winding of the chain or cable upon the drum, and the construction of the drill conductors or shoes, which are provided with special devices at their lower ends for releasing the seed to be dropped into the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
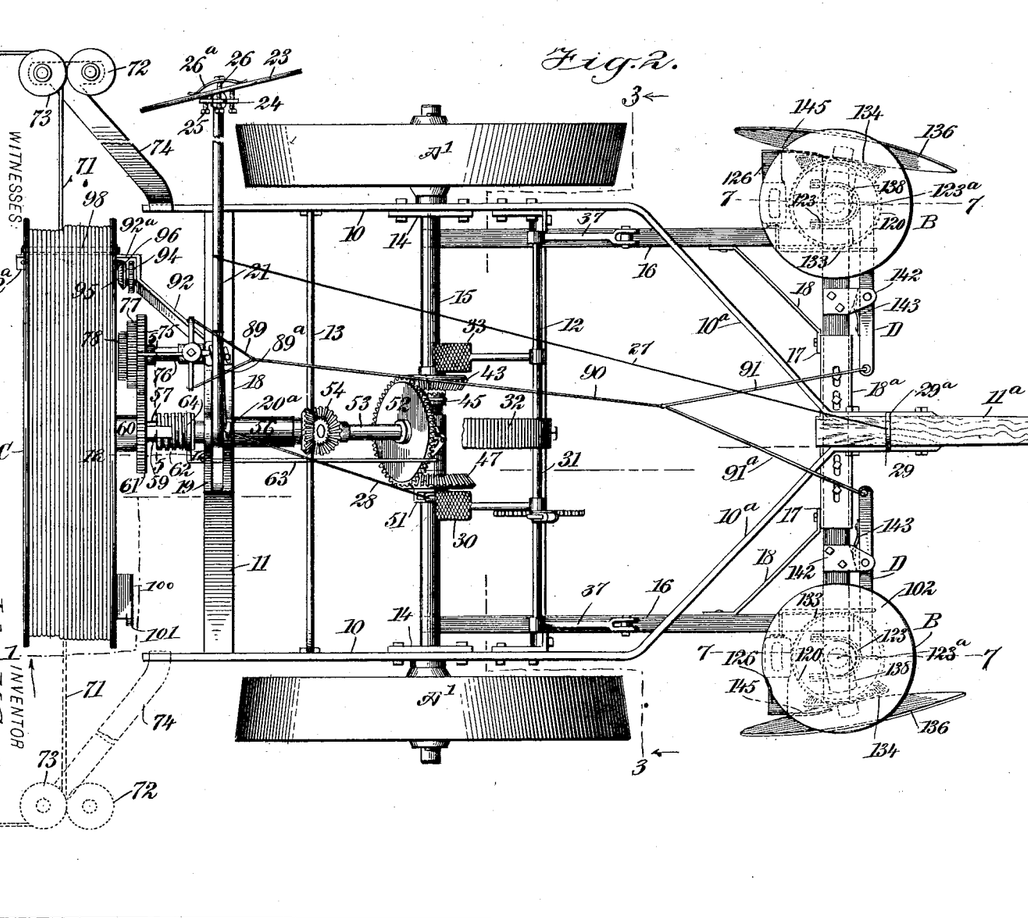
Fig. 2 is a plan view of the machine.
Figure 3:
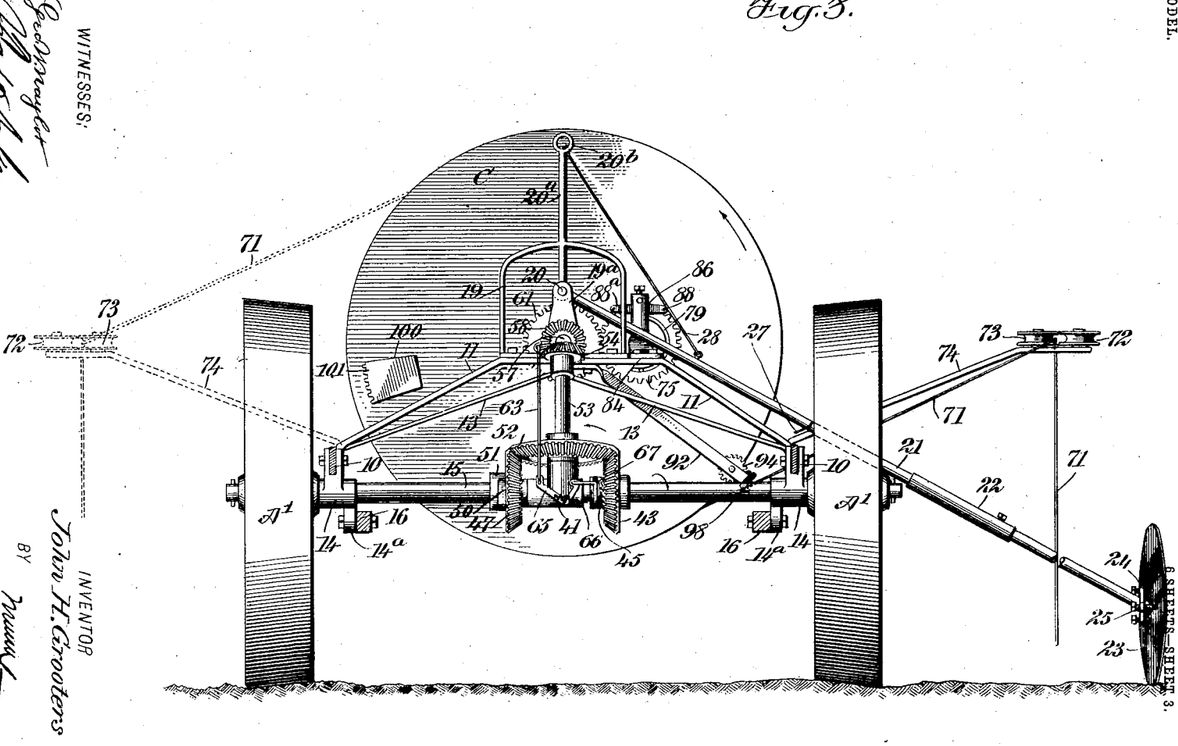
Fig. 3 is a transverse section through the machine, taken substantially on the line 3 3 of Fig. 2.

In the construction of the frame it mainly consists of two side beams 10, connected at the rear by an upwardly-arched beam 11 and intermediate of its ends by a flat cross-beam 12. The forward end portions $10^a$ of the side beams 10 are brought together and are secured to a tongue or pole $11^a$ in any suitable or approved manner. The side pieces 10 of the frame are further connected by an intermediate arched bar 13 of less height than the rear arched bar or beam 11, and the bar or beam 13 is in front of the said rear beam or bar 11, as is best shown in Fig. 2. From about the central portion of the main sections of the side beams 10 of the frame bearings 14 are downwardly projected, and these bearings have extensions $14^a$ from their bottom portions at or near their inner ends. In the main portion of the bearings 14 an axle 15 is suitably journaled, which axle serves as a driving-shaft for the machine, as the supporting-wheels A' are secured to the said axle, as is shown in Figs. 2 and 3.

A forward lower frame is provided adapted to carry seed-dropping mechanism B, to be hereinafter described. This forward lower frame consists of two side pieces 16, which are pivotally attached to downwardly-extending members $14^a$ from the bearings 14, and a front bar 17 is mounted to slide on the forward end portions of the said side beams 16. The said front beam 17 may be made in two sections or in a single piece. When in two sections, the inner ends of the sections pass through a sleeve $18^a$, properly supported, and when the cross-bar 17 is in one piece this sleeve is at the central portion of the cross-bar. The said sleeve is provided with slots, as is shown in Fig. 2, through which slots bolts are passed, enabling the front cross-bar either when in one piece or in sections to be adjusted relative to the side pieces 16 of the said lower forward frame.

On the upper portion of the rear arched bar 11 a vertically-slotted arched extension 19 is firmly secured, and at the central portion of the said arched extension 19 and practically within said extension bearings $19^a$ are secured to a suitable support. Through the top of the said bearings a pivot-pin 20 is passed, while a rod $20^a$ is extended up through the arched extension 19 at the forward central portion of said extension, terminating at its upper end in an eye $20^b$. The upper or inner end of a marker-shaft 21 is pivoted between the said lugs or standards $19^a$ by the said pivot-pin 20, as is best shown in Fig. 3. This marker-shaft is preferably made in two sections adjustably connected by a sleeve 22, permanently secured to one section and adjustably attached to the other section through the medium of a thumb-screw or its equivalent.

The marker 23 employed is a disk marker, and it is loosely mounted on a threaded reduced extension 26 from the lower end of the marker-shaft 21, as is best shown in Fig. 2. This disk marker 23 may be given any desired angle with reference to a longitudinal line drawn through the machine, so as to increase or decrease the width of the mark to be made, and such adjustment is accomplished by attaching a plate 24 to the threaded extension 26 from the marker-shaft 21, the said plate being transversely located with reference to the shaft and extends beyond opposite sides and above and below the shaft. This plate 24 carries a series of adjusting-screws 25, the inner ends of which screws are made to engage with the inner face of the marking-disk 23. A spring $26^a$, preferably a bow-spring, is secured at its center to the outer extremity of the said marker-shaft 21 and has bearing against the central outer portion of the marking-disk, so as to hold the marking-disk in the position to which it may have been carried by the adjustment of the said screws 25.

It may be here remarked that the sleeve $18^a$ serving as a guide for the front bar or beam 17 of the lower front frame of the machine may be supported by braces 18, secured to the end portions of the said sleeve and to the side beams 16 of the frame.

Figure 1:
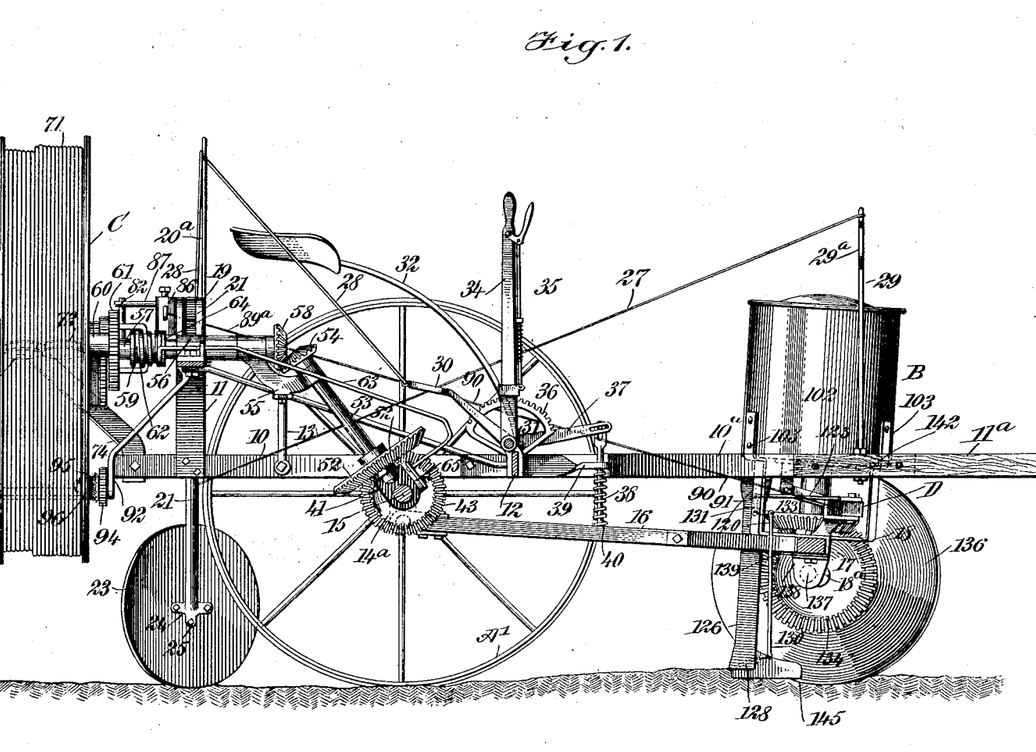
Figure 1 is a longitudinal vertical section through the machine, taken practically on the line 1 1 of Fig. 2.

The marker-shaft 21 is adapted to be carried from one side of the machine to the other, as occasion may demand, and such shifting of the marker-shaft and its marking-disk is preferably accomplished in the following manner: Two ropes, chains, or cables 27 and 28 are attached to the marker-shaft 21, one preferably between its center and upper end, and the other more or less near its lower end. The rope, chain, or cable 28 is carried through the eye $20^b$ of the rod $20^a$ at the rear of the machine, as is shown in Figs. 1, 2, and 3, while the rope, chain, or cable 27 is carried directly to the front of the machine and is attached, preferably, to a rod 29, which extends upwardly from the inner end of the pole or tongue $11^a$, and this rod 29 may be and preferably is provided at its upper portion with a rein-guide $29^a$. The other rope, chain, or cable 28 is carried downward and to the right-hand side of the machine and is attached to a foot-treadle 30, attached to a shaft 31, which shaft is journaled in suitable bearings carried by the side members 10 of the main frame. The said shaft 31 is over the intermediate flat cross-bar 12. The support 32 for the driver's seat is secured to this intermediate cross-bar 12 and occupies a central position between the right-hand treadle 30 and the left-hand treadle 33, likewise attached to the said shaft 31. The shaft 31 may be rocked by the weight of the operator on the said treadles 30 and 33, and the downward movement of the right-hand treadle 30 will cause the marker-shaft 21 to be raised. If the action of this treadle 30 is not sufficient to carry the marker-shaft over the center of the machine, so that it can fall to the opposite side, such final adjustment of the marker-shaft may be quickly accomplished by giving the rope, chain, or cable 27 a quick strong pull, and this cable 27 is particularly adapted to lift the marker readily from the ground. The rope, chain, or cable 27 is within convenient reach from the driver's seat.

The marker-shaft 21 is generally carried from one side of the machine to the other when the machine is to be reversed, and at such time the marking devices, to be hereinafter described and which are carried by the front lower frame, should be raised from the ground. Consequently the shaft 31 is provided with forwardly-extending crank-arms 37, attached thereto near each end, and these crank-arms 37 are over the side beams or sections 16 for the lower forward frame-section of the machine. Each of the crank-arms 37 is connected with the upper end of a link 38, passed down through suitable guides 39, extending from the aforesaid cross-bar 12 of the main section of the frame, and these links 38 are connected in any approved manner with the side beams 16 of the front lower section of the frame, as is shown in Fig. 1. Where the links 38 connect with the forwardly-extending crank-arms 37 the pivot-pins for the two parts are passed through slots longitudinally made in both parts, as is also shown in Fig. 1, wherein it will be further observed that springs 40 are coiled around the links 38, extending from the side beams 16 to the bearings 39, and these springs normally act to press the forward lower section of the frame of the machine downward. The operation of the said shaft 31 may be assisted by the right hand of the driver, and to that end a lever 34 is secured to the shaft 31, extending upwardly therefrom within reach from the driver's seat. This lever 34 is provided with the usual thumb-latch 35, which engages with a rack 36, secured, preferably, to the intermediate cross-bar 12.

Figures 12, 13, 14, 15, 16, 17, 18:
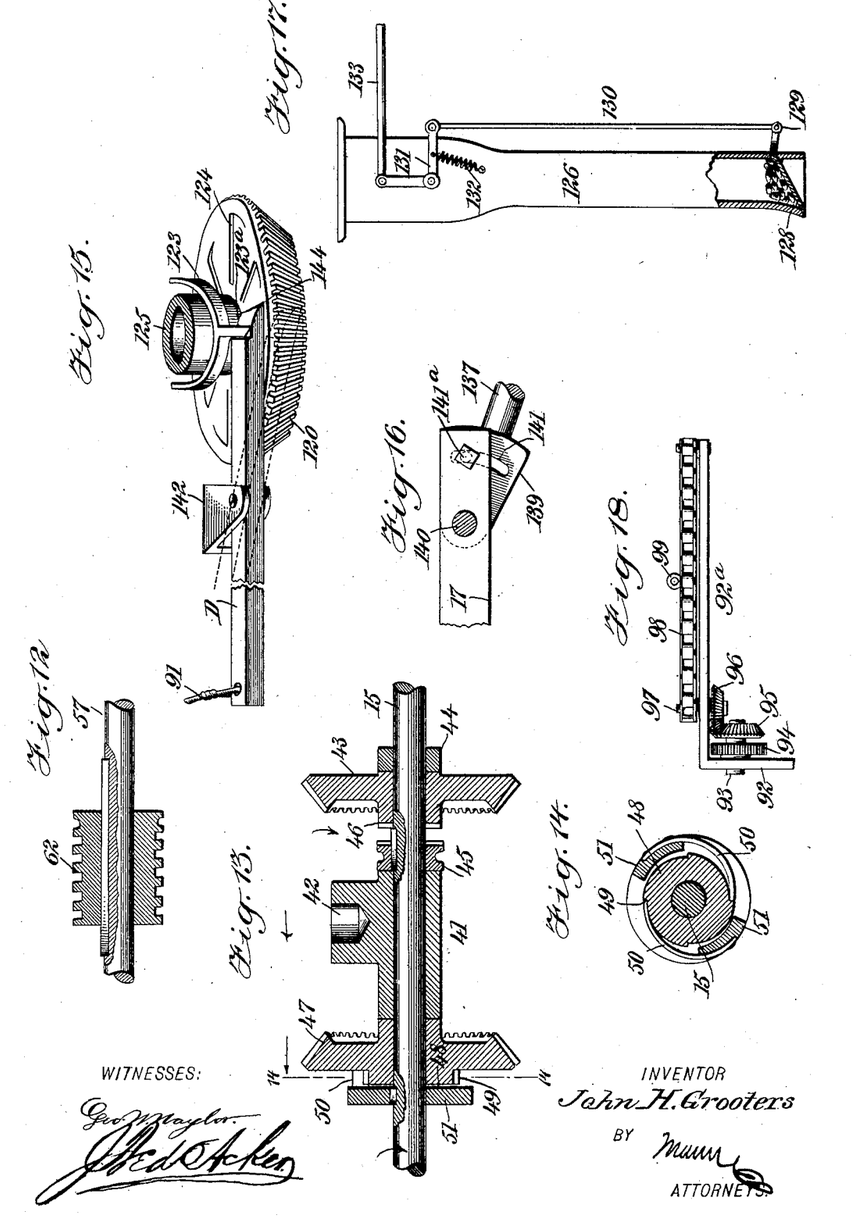
Fig. 12 is a detail sectional view of a controlling device for the drum, the section being taken practically on the line 12 12 of Fig. 2.
Fig. 13 is a detail sectional view of the driving-gearing and a clutch carried by the main shaft or axle, the section being taken practically on the line 13 13 of Fig. 3.
Fig. 14 is a transverse section on the line 14 14 of Fig. 13.
Fig. 15 is a detail perspective view of the gear and clutch-lever directly controlling the seed-drop disk of the seedbox.
Fig. 16 is a detail plan view of the adjustable bracket-support for a furrow-forming disk.
Fig. 17 is a sectional side elevation of a shoe, conducting-tube, or drill for receiving seed from the seedbox, also illustrating the means employed for controlling the dropping of the seed from the said shoe or drill.
Fig. 18 is a detail view of the device employed to guide the wire when being wound upon the drum.

A sleeve 41 is located at the central portion of the axle or main drive-shaft 15, (shown in detail in Fig. 13,) and a bearing 42 is formed in the upper portion of this sleeve. At the left-hand side of this sleeve 41 and removed a predetermined distance therefrom a bevel-gear 43 is loosely mounted on the said shaft or axle 15, and in engagement with the outer face of this gear a collar 44 is secured on the said shaft or axle 15. The teeth of the gear-wheel 43 face in direction of the right-hand end of the shaft or axle, and between the left-hand end of the bearing 41 and the left-hand bevel-gear 43 a clutch 45 is mounted to slide upon and turn with the said shaft or axle 15, adapted for engagement with a clutch-surface 46 on the inner hub of the aforesaid bevel-gear, as is also shown in Fig. 13. In the same figure it will be observed that at the right-hand end of the said sleeve 41 a second bevel-gear 47 is loosely mounted, being of the same size as the opposing bevel-gear 43, and the teeth of the bevel-gear 47 also face inward.

The outer hub 48 of the right-hand bevel-gear 47 is provided with ratchet-teeth 49, as is shown in Figs. 13 and 14, and these ratchet-teeth are engaged by spring-dogs 50, secured to a collar or a disk 51, which is attached in any suitable or approved manner to the shaft or axle 15 and turns therewith. The left-hand bevel-gear 43 is not brought into action until it is engaged by the collar 45, and at such time the right-hand bevel-gear 47 is idle, as the dogs 50 will simply slip over the ratchet-teeth on the hub of the gear; but when the gear 43 is out of engagement with the clutch 45 the gear 47 will be turned by the shaft or axle 15 through the medium of the said disk and its dogs. This is accomplished by causing the two bevel-gears 43 and 47 to be constantly in mesh with a bevel-gear 52, as shown in Figs. 1, 2, and 3, the bevel-gear 52 being practically horizontally placed above the said gears 43 and 47. This upper connecting bevel-gear 52 is secured on the shaft 53, the lower end of which shaft 53 is journaled in the bearing 42, carried by the sleeve 41. The shaft 53 has an upward and a rearward inclination and is provided at its upper end with a bevel-pinion 54. The upper portion of the shaft 53 is journaled in a bifurcated bearing 55, carried by the intermediate arched bar 13, as is best shown in Fig. 1, and a horizontal shaft 57 is likewise journaled in the said bearing 55 and in an intermediate bearing 56, carried by the rear arched beam or bar 11. At the forward end of the shaft 57 a bevel-pinion 58 is secured, meshing with the pinion 54 on the shaft 53.

It will be observed that the two shafts 53 and 57 will be turned in one direction when the bevel-gear 43 on the axle or main shaft 15 is engaged by the clutch 45, and the said shafts will be turned in a reverse direction when the bevel-gear 43 is disconnected from the clutch 45. The opposing bevel-gear 47 is made to turn with the said drive or main shaft 15 in the manner which has been described.

A drum C is mounted to loosely turn on the rear end of the horizontal shaft 57. At the front central portion of the drum C a hub 60 is secured, and the said hub carries at its outer or forward end a gear-wheel 61, the shaft 57 passing loosely through this gear-wheel and the said hub 60. The gear-wheel 61 is provided with upper and lower fingers 59, which are made to travel in engagement with the thread of a worm 62, which worm is in front of the said gear-wheel 61 and is mounted to turn with the shaft 57, yet has limited sliding movement thereon, as is shown in Fig. 12. A shifting rod 63 is connected with the worm 62 by means of a ring 64, which is loosely fitted in the annular groove at the forward end of the worm. This shifting rod 63 extends downward to the front central portion of the axle or shaft 15 and is connected with one end of a bell-crank lever 65, fulcrumed at the junction of its members upon the outer lower portion of the sleeve 41, through which the central portion of the axle or shaft 15 passes. A spring 66 is attached to this lever at one side of its pivot-point and to the sleeve 41 at the opposite side of the said pivot-point of the lever. A shifting fork 67 is attached to the other member of the bell-crank lever 65 and to the clutch 45. Sufficient play is provided where the shifting rod 63 and shifting fork 67 connect with the bell-crank lever 65 to permit the spring 66 to act quickly to throw either limb of the bell-crank lever in the desired direction.

Figure 4:
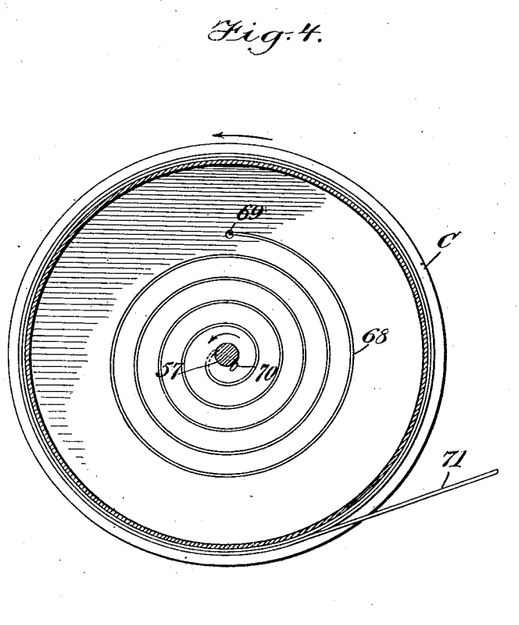
Fig. 4 is a vertical section through the wire-carrying drum and a transverse section through its shaft-support.

A coiled or helical spring 68 is located within the drum C, as shown in Fig. 4. This spring at its outer end 69 is attached to the drum in any suitable or approved manner, and the inner end 70 of the spring is secured to the shaft 57, around which the spring is coiled. The drum C is adapted to have a guide wire, chain, rope, or cable 71 wound upon or unwound from its periphery, and this wire, since a wire is preferably used when passing to or from the drum, is made to pass between guide-rollers 72 and 73, horizontally supported upon an arm 74, which is detachably connected to the rear end of a side member of the main frame 10, so that the arm or support 74 for these guide-rollers may be transferred from one side of the machine to the other, as occasion may demand.

In the operation of the winding and unwinding mechanism for the wire, chain, rope, or cable 71 when the machine starts the outer or free end of the wire, for example, is attached to a stake planted firmly in the ground at the starting end of the row. When the machine is set in motion for planting, the marker-disk 23 will act in the usual manner; but, as stated, the marking-disk may be set to make a mark more or less well defined. Next, with reference to the operation of the drum C, as the machine travels away from the stake the drum is turned by the action of the wire unreeling from the drum, and the shaft 57, supporting the drum, is turned in the same direction, but at greater speed than the speed of the drum, which relative operation of the two parts is indicated by arrows in Fig. 4. The intermediate driving-shaft 57 at this time is in clutch connection with the left-hand bevel-gear 43. The tendency of the drum in its rotation will be to wind up the spring 68, while the tendency of the shaft 57 in its rotation at such time will be to keep the spring unwound to such an extent that a uniform tension will be maintained for the spring, since, as the spring could be safely placed under a tension of nine pounds, for example, in order to preserve the spring against undue strain it is desirable that the tension thereon in operation should in such case be not more than six pounds. Therefore when the drum commences to race, and thus tends to unduly wind up the spring 68, the arms 59 from the gear 61, carried by the drum, will travel upon the worm 62 to such an extent as to force the worm 62 rearward upon its shaft and cause the shifting rod 63 to operate to carry the clutch 45 out of engagement with the left-hand gear 43, bringing the right-hand driving-gear 47 into action, whereupon the direction of rotation of the shaft 57 will be reversed until the spring 68 has been restored to its normal tension, and when such a point is reached the arms 59, referred to, will have so acted upon the worm 62 as to restore it to its normal position under such travel of the machine, and the clutch 45 will then be again made to engage with the left-hand gear 43, and such interchange between the driving bevel-gears 43 and 47 is maintained during the travel of the machine from the stake whenever such interchange is necessary to equalize the tension of the spring 68. When the machine is reversed to travel in direction of the said stake, a shifting lever 65 is manually operated by any suitably-applied hand or foot lever within convenient reach of the driver's seat to bring the right-hand gear 47 into action and to reverse the direction of travel of the drum C from the direction of travel shown by the arrows in Fig. 4, whereupon the spring 68 is so placed under tension as to cause the drum C to be turned by the shaft 57 and effect a rewinding of the wire 71 on the drum C as the stake is approached; but should the tension of the spring 68 at such time be increased to a comparatively dangerous extent the action of the worm 62 and the arm 59 from the gear 61, carried by the drum C, will be the same as has been described—namely, the shaft 57 will be under the control of either the driving-gear 47 or the driving-gear 43—thereby maintaining the tension of the spring 68 within the limit of a predetermined number of pounds.

It is thought best to here describe the means by which the seed-dropping mechanism is operated by the rotation of the drum C, the details of the said seed-dropping mechanism B to be referred to in detail later on.

Figure 5:
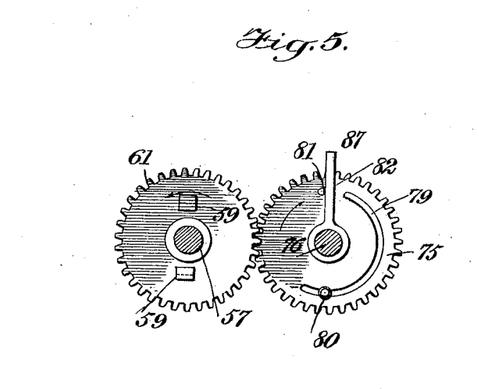
Fig. 5 is a detail view of the gearing for establishing communication between the drum and the seed-dropping mechanism, the shafts carrying the gearing being in section, as indicated by the lines 5 5 of Fig. 2.
Figure 6:
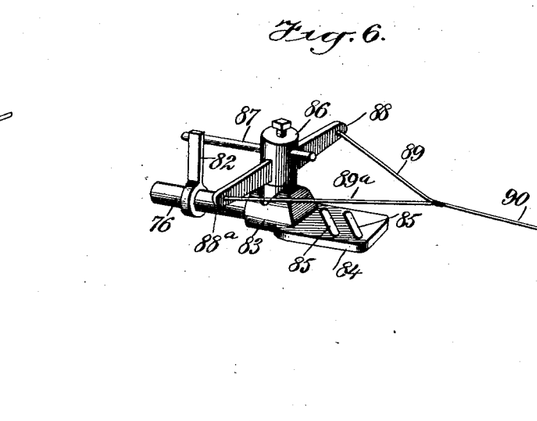
Fig. 6 is a perspective view of the trip mechanism for the seed-dropping device, which is acted upon by the gearing shown in detail in Fig. 5.

The communicating mechanism between the drum C and the seed-dropping mechanisms is as follows: A gear 75 of the inner diameter of the gear 61, carried by the drum C, is in mesh with the said gear 61, as is shown in Figs. 2 and 5. This gear 75 is loosely mounted upon a rearwardly-extending shaft 76; but the gear 75 is provided with two or more gears of less diameter secured thereto at its back, as is particularly shown in Fig. 2, either of which gears may be brought into mesh with the gear 61, carried by the drum C, so as to increase or decrease the speed of the seed-dropping devices. These reduced gears are designated as 77 and 78. The forward or larger gear 75 is provided with two pins 80 and 81, located practically opposite each other and near the periphery of the said gear, the pins extending from the forward face of the gear 75. The pin 81 is shown as a fixed pin, while the pin 80 is shown adjustable in a segmental slot 79, produced in the said gear 75; but I desire it to be understood that both of these pins 80 and 81 may be rendered adjustable, if desired. As stated, the connected gears 75, 77, and 78 are loosely mounted on the shaft 76, and the pins 80 and 81 are adapted to move an actuating-arm 82, which is loosely mounted on the shaft 76 at the front of the larger gear 75, as is shown in Fig. 5, the said actuating-arm being likewise shown in Fig. 6. One pin—the pin 81, for example—operates the actuating-arm 82 during the passage of the machine from the stake, and the other pin, 80, will operate the actuating-arm 82 during the passage of the machine toward the stake, or vice versa. The shaft 76, just referred to, is secured in a suitable bearing 83, and this bearing is attached to or may be integral with a horizontal plate 84, having one or more diagonal slots 85 produced therein, as is shown in Fig. 6. The plate 84 is attached, preferably, to the rear arched beam 11 at its top or to any other convenient support by means of adjusting screws or bolts passed through the diagonal slots 85, so that by loosening these set screws or bolts the plates 84 may be adjusted forward or rearward, as may be required to bring either one of the gears 75, 77, and 78 in mesh with the gear 61, operated by the action of the drum C. A sleeve 86 is mounted to turn upon a suitable stud carried upward from the bearing or sleeve 83, as is shown in Fig. 6, and a trip-pin 87 is horizontally secured to this sleeve 86, which trip-pin is adapted to be engaged by the actuating-arm 82 as the said arm is made to move by the rotation of the combined gears 75, 77, and 78. When the said actuating-arm 82 operates on the horizontal pin 87, it imparts a rocking motion to the sleeve 86, and this sleeve 86 has horizontal arms 88 and 88ª, which are made to extend from opposite sides of the sleeve, as is also shown in Fig. 6. Cords, ropes, chains, or cables 89 and 89ª are respectively attached to the arms 88 and 88ª. These two ropes, chains, or cables, or wires, if desired, are combinedly attached to a single wire, rope, chain, or cable 90, which is carried in direction of the forward end of the machine and is there connected with oppositely-branching wires, ropes, chains, or cables 91 and 91ª, as is best shown in Fig. 2. These forward branch wires, ropes, chains, or cables 91 and 91ª are adapted to act upon the regulating devices for the seed-dropping mechanisms B, as will be hereinafter particularly stated.

It is very desirable that some device should be employed to regulate the wire 71 while being wound upon the drum C and to impart more or less of a traverse motion to the said wire during the rewinding process. Such a device is illustrated in detail in Fig. 18 and is shown applied particularly in Figs. 1, 2, and 3. This device consists of a bracket-arm 92, attached at its upper end, for example, to the rear arched beam 11 of the main frame of the machine, and this bracket-arm 92 extends downward, rearward, and more or less outward, being provided at its lower end with a straight section (shown best in Fig. 2) and with a branch member 92ª, which extends at the lower portion of one side of the drum C out of engagement with the drum. At the straight lower portion of the bracket-arm 92 a spindle 93 is mounted to turn, and, as is particularly shown in Fig. 18, this spindle carries a pinion 94 and a bevel-pinion 95, both of which are secured to the said spindle and turn therewith. The bevel-pinion 95 meshes with a corresponding pinion 96, which is mounted on a spindle 97, extending through the branch member 92ª of the bracket-arm 92, and at the rear end of this spindle 97 a suitable sprocket-wheel is secured, over which an endless chain 98 is passed, the said chain being likewise passed over an idler sprocket-wheel (not shown) at the opposite or rear end of the branch member 92ª of the bracket-arm 92. The said endless chain 98 is provided with an eye 99, through which the wire 71 passes before it reaches the drum C.

The mechanism just described, and shown particularly in Fig. 18, is brought periodically into action by forming an offset 100 on the front face of the drum C, as shown best in Fig. 3, which offset is provided with a segmental outer edge, and in the said outer edge of the offset teeth 101 are produced. As the drum revolves the teeth of the offset 100 are brought to engagement with the pinion 94, turning the same, and thus imparting a limited movement to the endless chain 98, thereby guiding the wire 71 on the drum C to such an extent that one strand wound on the drum will not unduly crowd or overlap an adjacent strand in the same row or series.

Figure 7:
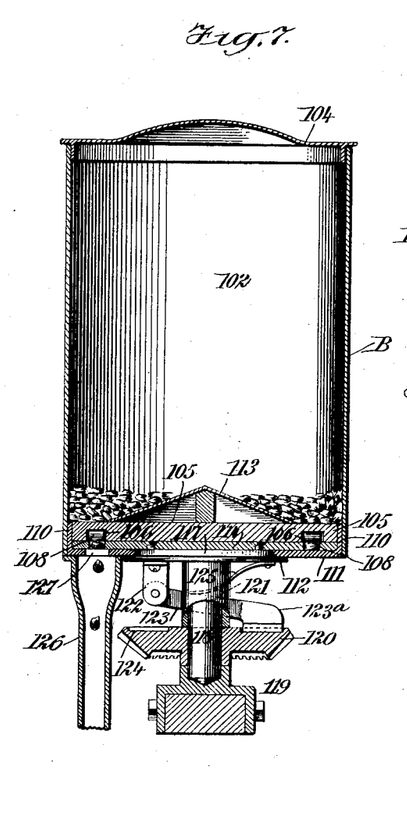
Fig. 7 is a vertical section through one of the seedboxes and directly-connected parts, the section being taken practically on the line 7 7 of Fig. 2.
Figure 8:
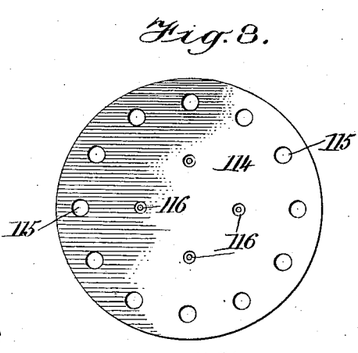
Fig. 8 is a plan view of a disk for a seedbox, which disk is provided with pockets to receive the seed.
Figure 9:
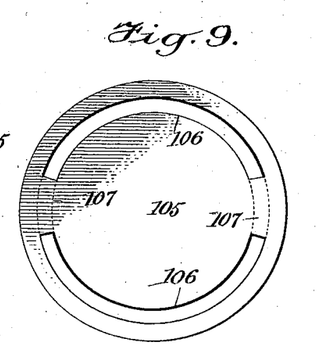
Fig. 9 is a plan view of the covering-disk for the pocket seed-disk shown in Fig. 8.
Figure 10:
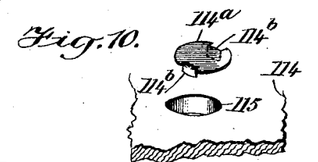
Fig. 10 is a detail perspective view of a portion of the pocket-disk for the seed, showing one seed-pocket and the removable cap adapted to close the pocket when desired.
Figure 11:
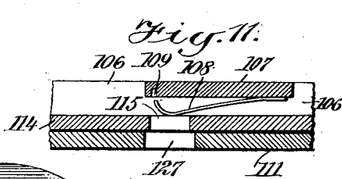
Fig. 11 is a detail cross-section through the lower disks of a seedbox.

The seed-dropping mechanism B is in duplicate, one mechanism being located at each front corner of the lower front frame-section of the machine. The front bar 17 of this frame-section, as has been stated, is preferably in two sections, so that the opposing seed-dropping mechanisms may be adjusted to or from each other, as may be required by the character of the planting necessary. I will describe a single seed-dropping mechanism, as one is a duplicate of the other. A seedbox 102, capable of holding any desired amount of seed, is secured to one of the sections of the front bar 17 of the lower front frame-section of the machine by upwardly-extending brackets 103, (best shown in Fig. 1,) although other means may be employed. As is shown in the said Fig. 1, these brackets when used are more or less U-shaped in general outline. The seedbox 102 is provided with a removable cover 104 of any suitable description. The bottom of the body of the seedbox 102 is open and receives an upper disk 105. (Shown in Figs. 7 and 9.) In this upper disk 105 an annular recess 106 is made, and at the upper face of the disk 105, at opposing points in the said recess 106, bridge-sections 107 are made, the recess continuing beneath the said bridge-sections, as is shown in Fig. 11. Therefore while the recess 106 is annular at the bottom of the disk 105 it appears in opposing segmental sections at the upper ends of the said disk, as is illustrated in Fig. 9. Just below each bridge-section 107 of the disk 105 of a seedbox 102 smoothing or regulating springs 108 are secured at one end, the other end of the springs being curved downward and then upward, and in the upper position of the springs the upwardly-curved front ends thereof will enter recesses 109, made in the under faces of the bridges 107, as is shown in Fig. 11. This upper disk 105 is secured to an annular flange 110, which is carried upward from a bottom disk 111, which is provided with a central opening 112, (shown in Fig. 7,) and a space is made to intervene the lower disk 111 and the upper recessed disk 105. At the upper central portion of the upper disk 105 a conical partition 113 is preferably formed, so as to direct the seed in the seedbox 102 into the upper portion of the upper fixed disk 105. Between the lower fixed disk 111 and the upper fixed disk 105 a rotary seed-dropping disk 114 is located. This disk is shown in detail in Fig. 8 and partially in detail in Fig. 9, and it is provided with any desired number of seed-receiving pockets 115, circularly arranged adjacent to the periphery of the said seed-dropping disk. These pockets extend through without interruption from the upper to the lower face of the disk. At the central portion of the seed-dropping disk 114 countersunk apertures 116 are provided, whereby the said seed-dropping disk 114 may be secured to an upper flange 117, loosely fitting in the opening 112 of the lower fixed disk 111, as is shown in Fig. 7. This upper flange 117 is secured to a vertical downwardly-extending shaft 118, journaled at its lower end in suitable bearings 119 on the sectional front bottom 17 of the lower front frame of the machine. A bevel-gear 120 is loosely mounted at the lower end of the said downwardly-extending shaft 118, as is shown particularly in Fig. 7, and a collar 121 holds the said gear 120 in proper position as the said collar extends around the shaft 118 from the upper face of the gear 120 to the lower face of the upper flange 117 of the said shaft. A hanger 122 extends down from the upper flange 117 of the shaft 118, as is also best shown in Fig. 7, and an actuating-fork 123 is pivotally connected to the said hanger, being provided with an outwardly and downwardly extending lip 123$^a$, having one of its sides beveled at its lower edge, and a spring 125 has bearing upon the fork, tending to normally force the lip 123$^a$ in engagement with the upper surface of the said bevel-gear 120. In the outer surface of the said gear 120 a series of radial recesses 124 is made, either of which recesses is adapted to receive the lip 123$^a$ of the fork 123. A single aperture 127 is made in the bottom fixed disk 111 of the seedbox, the aperture 127 being near the margin of the disk. This aperture 127 is adapted to register with each one of the seed-receiving pockets 115 in the seed-dropping disk 114 as the said disk is revolved. The seed passing down from a pocket 115 in the seed-dropping disk 114 will therefore pass through the opening 127 in the lower or bottom disk 111 of the seedbox and will fall into a boot or drill conductor 126, which is properly secured to the said lower fixed disk 111, as is shown in Fig. 7. It may here be stated that preferably each seed-receiving pocket 115 is adapted to receive a single seed only, although I do not limit myself to the particular dimensions of the said pockets. All of the seed-receiving pockets 115 may be left free to receive seed; but any desired number of them may be closed. When the pockets are to be closed, a cap 114$^a$ is employed (shown in Fig. 10) having downwardly-extending flanges 114$^b$, whereby to hold the cap in fixed position in a pocket. Under this construction it is obvious that the seed may be dropped at desired intervals apart and that as many pockets may be brought into action during a revolution of a seed-dropping disk 114 as may be found necessary for the character of the seed employed.

At the bottom portion of the boot or drill 126 a gate 128 is pivoted, adapted to normally close the bottom of the boot or drill, as is shown in Fig. 17, until a suitable amount of seed has been accumulated therein, at which time the gate is dropped to spill the seed into the ground. The pivot of the gate 128 is provided with an outwardly-extending crank-arm 129, to which one end of a connecting-rod 130 is pivotally attached, the other end of the connecting-rod being pivotally attached to the normally horizontal limb of a bell-crank lever 131, pivoted at the outside upper portion of the shoe, boot, or drill 126, and a spring 132 is attached to this lower limb and to the boot or drill below the limb, so as to hold the said lower limb normally in horizontal position and the gate 128 closed. A rod 133 is pivotally attached to the upper end of the horizontal limb of the said bell-crank lever 131, whereby to operate the said lever in a manner to be hereinafter set forth.

The bevel-gear 120, which when the lip of the fork 123$^a$ is in engagement with one of its upper recesses 124 operates the seed-dropping disk 114, is actuated by engagement with a bevel-gear 134, which bevel-gear is secured upon a shaft 137, extending horizontally outward below the front cross member of the lower front section of the frame, and at the outer end of this shaft 137 a furrow-opener 136 is secured, which is in the form of a disk.

It is very desirable that this furrow-opener 136 should be adjusted at such angles as to make the furrow narrow or wide, as may be desired. To that end the shaft 137 is journaled in a hanger 138, which hanger at its top is provided with a plate 139, (shown particularly in Fig. 16,) the said plate being of a segmental type, and at its contracted end the plate 139 is pivoted by a suitable pin 140 to a section of the front member of the said lower frame-section of the machine. At the wider or outer end of the plate 139 a segmental slot 141 is made, through which a bolt 141$^a$ passes, the said bolt being carried through the said member 17 of the lower forward frame-section. Thus by loosening and tightening the bolt 141$^a$ and moving the plate 139 in direction of the right or left of the machine the furrow-opening disk 136, carried by the hanger 138, may be placed at any angle required.

In connection with a bevel-gear 120, operating the seed-dropping disk of a seedbox, a controlling-arm D is employed, the arm being normally parallel with and in front of the end section 17 of the front member of the lower frame-section of the machine, as is shown in Fig. 2. The controlling-arm D is pivoted about centrally between its ends in a horizontal bracket 142, which extends forward from the front section 17 of a lower frame-section, and the outer end of the controlling-arm D is normally held over and in engagement with the upper face of the actuating bevel-gear 120 for the seed-dropping disk of the seedbox by a suitable spring 143. (Shown in Fig. 2.) The outer end of the controlling-arm D is beveled downwardly and outwardly at its upper surface, and when this arm is in its normal position, which is shown in Fig. 1, the lip 123$^a$ of the fork 123 will be held by the inclined surface (designated as 144) out of possible entrance into any of the recesses 124 in the gear 120. The inner end of one controlling-arm D for one seed-dropping mechanism B is attached to the fork extension 91 of the rope, chain, or cable 90, actuated by the movement of the drum C, while the controlling-arm D of the opposing seed-dropping mechanism B is connected with the opposing forked extension 91$^a$ of the said cable 90, as is shown in Fig. 2 and has been heretofore described.

In the operation of the seed-dropping mechanisms when the actuating-arm 82 engages with the trip-arm 87 and turns the sleeve 86 and arms 88 and 88$^a$ with which the cable, rope, chain, or wire 90 is connected the inner ends of the controlling-arms D are drawn inward, and the outer ends of the said arms are then carried from over the gears 120, actuating the seed-dropping slides, and the lips 123$^a$ of the forks 123 will enter one of the recesses 124 in the said gears 120, and as these gears are constantly revolved while the machine is in action rotary motion will then be imparted, through the forks 123, to the seed-dropping disks 114, causing the various open pockets which have received seed, leveled off by the springs 108, to be brought into registry with the openings 127 in the bottom disk of the seedbox 102, thus permitting the said seed to drop down into the boot or drill 126, where the seed will be held for a predetermined time by the gate 128, which remains closed. As soon as the outer ends of the controlling-arms are moved away from the forks 123 they return to normal position by the action of their springs 143, so that as soon as the gears 120 have made one revolution the beveled outer ends 144 of the controlling-arms D will again enter beneath the lips 123$^a$ of the forks 123 and will carry said lips from engagement with the gears 120, permitting the gears to continue to revolve freely until such time as through the action of the drum C other seeds are to be released from the seedboxes. At the proper time the gates 128 in the boots or drills 126 are dropped downward and opened, and this opening occurs the moment that the outer ends of the controlling-arms D are carried outward, as the rods 133, connected with the bell-crank levers 131 on the said boots or drills, are connected with the outer end portions of the said controlling-arms, as is shown in Fig. 1, so that as soon as the gears 120 are set in motion to operate the seed-dropping disks the seed formerly accumulated in the boots or drills is dropped therefrom, and quickly afterward or when the controlling-arms are turned to their normal position the gates 128 are closed by their controlling-springs 132, so that the seeds dropped by the subsequent revolution of the gears 120 are retained in the boots or drills, when the said gears 120 are again brought into operative action with relation to the action of the seed-dropping disks. Preferably the boots or drills are given an outward and downward inclination, (shown in Figs. 1 and 17,) and at their lower ends rearwardly-extending and inwardly and forwardly curved plates 145 are secured, which act as a shield, preventing the clods of earth falling in the furrows before the seed is dropped. The supporting-wheels A', which are inwardly inclined at their peripheries, close the furrows as they pass directly over them.

Figure 19:
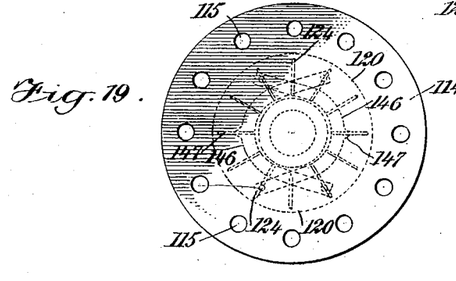
Fig. 19 is a plan view of the seed-pocket disk for the seedbox and likewise a plan view of a modified form of device for rotating said disk.

In Fig. 19 I have illustrated a slight modification with reference to the manner in which a seed-dropping disk 114 is operated, it being the purpose of the construction shown in this view to stop the operation of the seed-dropping disk at each half-revolution. To that end opposing spring horseshoe-shaped arms 146 are substituted for the single forks 123, the said spring-arms at their front ends being secured to the bottom portion of the disks and being free at their bow portions. At the central part of the bow portion of each spring-arm 146 a lip 147 is located, adapted to enter opposing recesses 124 in the gear-wheel 120, operating in conjunction with a disk, the recesses in the said gear-wheels 120 being the same as has been heretofore described, as is shown in Fig. 15.

Having thus described my invention, I claim as new and desire to secure by Letters Patent—

1. In planters, a seed-dropping mechanism, a wire guide for the machine, a tension-controlled carrier for the wire guide, and an operative connection between the carrier and the seed-dropping mechanism, which connection is arranged to bring the seed-dropping mechanism into and out of operation, as described.

2. In planters a seed-dropping mechanism comprising a receptacle for seed, a seed-dropper for the same, and a controlling element for the seed-dropper, a wire guide for the machine, a tension-controlled support for the wire guide, devices for controlling the wire guide, and a connection between the tension-controlled support for the wire guide and the controlling element of the seed-dropper.

3. In a planter, a seed-dropping mechanism, a wire guide for the planter, a tension-controlled rotary carrier for the wire guide, a driving device for the seed-drop member of the seed-dropping mechanism, transmitting-gearing operated by the movement of the said wire-carrier, a rocking element controlled by the transmitting-gearing, and a connection between the rocking element and the driving device for the seed-dropping mechanism, acting to bring the driving mechanism into and out of positive control by the seed-drop member, as described.

4. In a planter, a seed-dropping mechanism, comprising a box, feed and distributing disks fixed in the box, a drop-disk mounted to revolve between the fixed disks, and having pockets adapted to register, as the disk revolves, with the inlets and outlet of the fixed feed and distributing disks, a drum, a guide-wire connected with the drum, means for rotating the drum, a driving mechanism for the seed-drop disk, and a clutch connection between the seed-drop disk and its driving mechanism, operated by the drum when rotating in either direction, as specified.

5. In a planter, a seed-dropping mechanism, comprising a box, feed and distributing disks fixed in the box, a drop-disk mounted to revolve between the fixed disks and having pockets adapted to register with the inlets and outlet of the fixed feed and distributing disks as the said drop-disk revolves, a drum, a guide-wire connected with the drum, means for rotating the drum, a driving mechanism for the seed-drop disk, and a clutch connection between the seed-drop disk and its driving mechanism, transmitting-gearing operated by the drum when rotating in either direction, and a shifting device for the clutch, operated at intervals by the said gearing to bring the driving mechanism in driving connection with the seed-drop disk and operating automatically to break such connection, as described.

6. In a planter, a seedbox having two spaced fixed disks at its bottom, one above the other, the lower disk being provided with a single outlet-opening and the upper disk having an annular groove in its bottom extending through from top to bottom except at opposite points where the said grooves are separated at the top by opposed bridges, springs attached to the under faces of the bridge portion of the upper disk, extending downward therefrom at one end, a seed-dropping disk mounted to revolve between the fixed disks and provided with a series of pockets therein, extending through from top to bottom and adapted in the rotation of the said central disk to register with the openings in the upper disk and the opening in the lower disk, a drill attached to the bottom of the seedbox below the outlet-opening of the lower disk, a shaft attached to the seed-dropping disk, a gear loosely mounted on the said shaft, a driving mechanism for the said gear, a clutch connection between the seed-dropping disk and the said gear, and a lever adapted to operate over the gear and cause the clutch to engage with the gear and turn therewith, and to carry the clutch out of engagement with the gear, as specified.

7. In a planter, a seed-drop provided with a series of pockets, and caps adapted to be removably placed in the said pockets to close any one or more of them, as described.

8. In a planter, a frame, a disk furrow-opener adjustably mounted on the frame, a seedbox located above the said frame and supported thereby, provided with a rotary seed-drop disk, a shaft extending from the said seed-drop disk, a gear loosely mounted on the said shaft, a gear carried by the shaft of the furrow-opener, meshing with the gear on the shaft connected with the seed-drop disk, a clutch connected with the seed-drop disk, adapted to enter openings in the gear loosely mounted on the shaft of the disk, and a lever normally acting to hold the said clutch out of engagement with the said gear, as specified.

9. In a planter, a frame, a disk furrow-opener adjustably mounted on the frame, a seedbox located above the said frame and supported thereby, provided with a rotary seed-drop disk, a shaft extending from the said seed-drop disk, a gear loosely mounted on the said shaft, a gear carried by the shaft of the furrow-opener, meshing with the gear on the shaft connected with the seed-drop disk, a clutch connected with the seed-drop disk, adapted to enter openings in the gear loosely mounted on the shaft of the disk, a lever normally acting to hold the said clutch out of engagement with the said gear, a boot extending down from the seedbox, a gate located in the said boot, and a link and lever connection between the said gate and the lever operating the said clutch, all combined for operation in substantially the manner set forth.

In testimony whereof I have signed my name to this specification in the presence of two subscribing witnesses.

JOHN H. GROOTERS.

Witnesses:
C. R. YOUNG,
W. EMMERT.